(12) United States Patent
Langner et al.

(10) Patent No.: US 8,539,926 B2
(45) Date of Patent: Sep. 24, 2013

(54) PISTON, CYLINDER AND PISTON ASSEMBLY AND PISTON RING FOR A PISTON

(75) Inventors: Karlheinz Langner, Stittendorf (AT); Reiner Ulrich, Weissach (DE)

(73) Assignee: Mahle Koenig Kommanditgesellschaft GmbH & Co. KG, Rankweil (AT)

( * ) Notice: Subject to any disclaimer, the term of this patent is extended or adjusted under 35 U.S.C. 154(b) by 36 days.

(21) Appl. No.: 12/652,846

(22) Filed: Jan. 6, 2010

(65) Prior Publication Data

US 2010/0147252 A1 Jun. 17, 2010

Related U.S. Application Data

(63) Continuation of application No. PCT/AT2008/000112, filed on Mar. 27, 2008.

(30) Foreign Application Priority Data

Jul. 6, 2007 (AT) ................................ A 1049/2007
Oct. 12, 2007 (AT) ................................ A 1639/2007

(51) Int. Cl.
*F02F 3/00* (2006.01)

(52) U.S. Cl.
USPC ....................................................... 123/193.6

(58) Field of Classification Search
USPC ................. 123/193.6; 92/208, 224, 232, 239
See application file for complete search history.

(56) References Cited

U.S. PATENT DOCUMENTS

| | | | | |
|---|---|---|---|---|
| 1,646,998 A | | 10/1927 | Gill, Jr. | |
| 2,035,692 A | * | 3/1936 | Dietrich | 92/224 |
| 2,128,451 A | * | 8/1938 | Burton | 92/232 |
| 2,190,207 A | * | 2/1940 | Dillon | 92/233 |
| 3,412,719 A | | 11/1968 | Sheaffer et al. | |
| 4,338,858 A | | 7/1982 | Reitz | |
| 5,231,916 A | * | 8/1993 | Weiler | 92/172 |
| 5,979,391 A | * | 11/1999 | Ulrich et al. | 123/193.6 |
| 6,457,721 B1 | | 10/2002 | Bloemers et al. | |
| 6,860,190 B2 | * | 3/2005 | Oversby et al. | 92/208 |

(Continued)

FOREIGN PATENT DOCUMENTS

DE 2430829 1/1976
DE 102005055787 A1 5/2007

(Continued)

OTHER PUBLICATIONS

International Search Report, dated Sep. 12, 2008.

*Primary Examiner* — M. McMahon
(74) *Attorney, Agent, or Firm* — Laurence A. Greenberg; Werner H. Stemer; Ralph E. Locher

(57) ABSTRACT

A piston includes a piston head, two skirt walls disposed opposite one another and at least one pin bearing disposed between the skirt walls and supported on the piston head. Each skirt wall extends over a partial region of the periphery of the piston or piston head. The two skirt walls are connected by at least one self-supporting support wall disposed at a distance from the piston head. A cylinder and piston assembly and a piston ring for a cylinder, are also provided.

23 Claims, 6 Drawing Sheets

(56) References Cited

U.S. PATENT DOCUMENTS

| | | | |
|---|---|---|---|
| 6,880,503 B2 * | 4/2005 | Rosskamp | 123/73 PP |
| 6,895,910 B2 * | 5/2005 | Geyer et al. | 123/73 PP |
| 7,178,501 B2 * | 2/2007 | Schmidt et al. | 123/197.1 |
| 7,331,276 B2 * | 2/2008 | Schle.beta.mann et al. | 92/239 |
| 2006/0266310 A1 | 11/2006 | Yamaguchi | |
| 2007/0113734 A1 | 5/2007 | Haussermann et al. | |
| 2008/0216790 A1 | 9/2008 | Breidenbach et al. | |

FOREIGN PATENT DOCUMENTS

| | | |
|---|---|---|
| EP | 1227270 A2 | 7/2002 |
| GB | 1285471 | 8/1972 |
| GB | 1445587 | 8/1976 |
| JP | 2000039066 A | 2/2000 |
| JP | 2005220746 A | 8/2005 |
| WO | 2007031188 A1 | 3/2007 |

\* cited by examiner

FIG. 20
FIG. 21
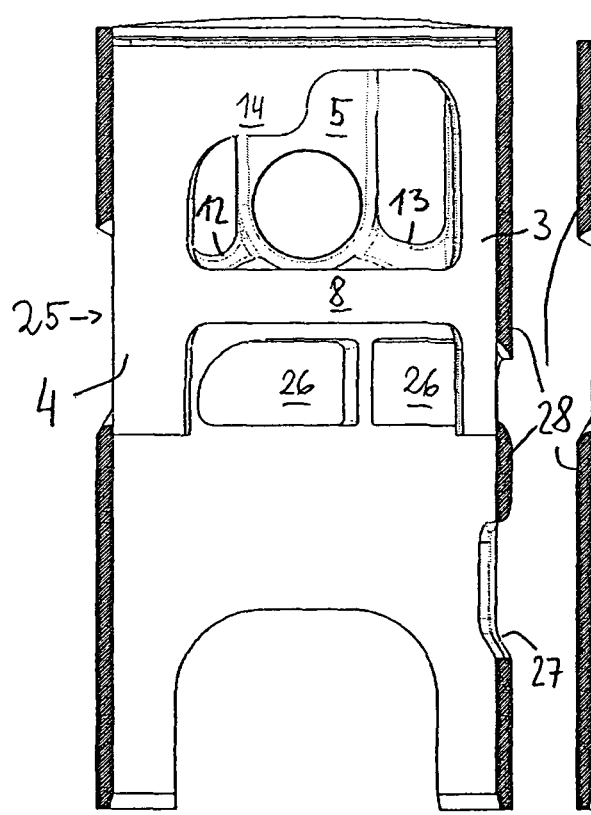
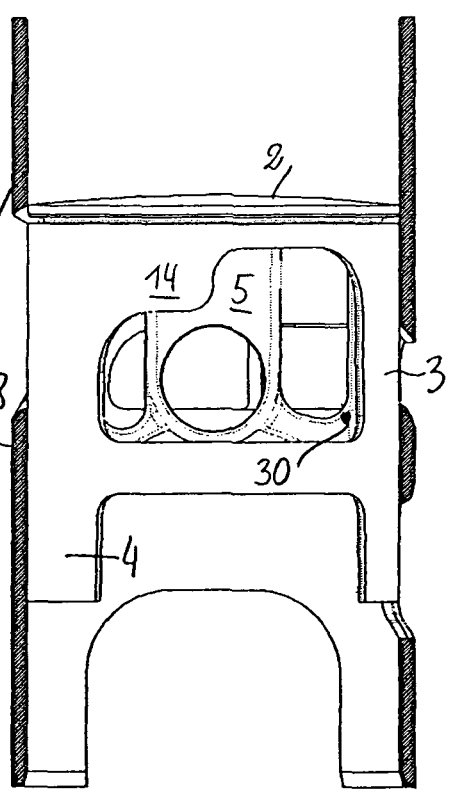

PISTON, CYLINDER AND PISTON ASSEMBLY AND PISTON RING FOR A PISTON

CROSS-REFERENCE TO RELATED APPLICATION

This is a continuation, under 35 U.S.C. §120, of copending international application No. PCT/AT2008/000112, filed Mar. 27, 2008, which designated the United States; this application also claims the priority, under 35 U.S.C. §119, of Austrian patent applications No. A 1049/2007, filed Jul. 6, 2007, and A 1639/2007, filed Oct. 12, 2007; the prior applications are herewith incorporated by reference in their entirety.

BACKGROUND OF THE INVENTION

Field of the Invention

The invention relates to a piston, especially for two-stroke engines, including a piston head, two skirt walls lying opposite one another and each extending over a partial area of an outer contour of the piston or the piston head and at least one pin bearing disposed between the two skirt walls and braced on the piston head. The invention also relates to a cylinder and piston assembly, especially for a two-stroke engine, having a piston according to the invention belonging to or supported within the cylinder. The invention additionally relates to a piston ring for a piston according to the invention or for a cylinder and piston assembly according to the invention, in which the piston ring has at least one of the features of the invention.

SUMMARY OF THE INVENTION

It is accordingly an object of the invention to provide a piston, a cylinder and piston assembly and a piston ring for a piston, which overcome the disadvantages of the heretofore-known devices of this general type and in which the piston can be subjected to high-level loading without a danger of comminution. Additionally, the piston should be easy to manufacture and to configure structurally. In addition, the piston should be suited for use in a two-stroke engine and be able to precisely close and open correspondingly required openings of the cylinder during operation.

With the foregoing and other objects in view there is provided, in accordance with the invention, a piston, especially for two-stroke engines. The piston comprises a piston head, two skirt walls lying opposite one another and each extending over a partial area of an outer contour of the piston or the piston head, at least one pin bearing braced on the piston head and disposed between the skirt walls, and at least one, preferably strip-shaped, self-supporting wall interconnecting the skirt walls and disposed at a distance from the piston head.

The support wall placed between the two skirt walls effects a precise guidance, especially of the end areas of the skirt walls far from the piston head, and the danger of comminution is reduced with no impairment of piston function in regard to guiding the mixture through. In addition, due to the supporting walls provided, the piston has a stable construction with strength values to match. Thus, the piston overall can be constructed to be lighter, and savings in material and energy result. At least one supporting wall each, which connects the skirt walls, is configured in the two cutouts between the skirt walls, placed opposite each other.

In accordance with another feature of the invention, the supporting wall has a curvature matching a curvature of the skirt walls. In this way, a stable guidance of the piston is achieved, while simultaneously improving pressure distribution on the inner wall of the cylinder.

In accordance with a further feature of the invention, one of the skirt walls extends over an angle of 55 to 90°, preferably 60 to 80°, and/or the other of the skirt walls, which if necessary is equally high, extends over an angle of 90 to 115°, preferably 100 to 110°, along an outer contour or edge of the piston head or is shaped onto the piston head. This is done in order to achieve an appropriate overlapping of the mixture flow openings in the cylinder.

In accordance with an added feature of the invention, good strength properties result if each pin bearing is braced with at least one housing wall or a support, especially two pairs of housing walls or supports or ribs placed opposite each other, which project from the lateral edge areas of the skirt walls.

In accordance with an additional feature of the invention, for simple assembly or disassembly of the piston bolt, side surfaces of the skirt walls, the at least one supporting wall connecting the skirt walls and a lower edge of the piston head, define a cutout leaving the at least one pin bearing free.

In accordance with yet another feature of the invention, it is favorable for the guidance of the piston in the cylinder and for the pressure distribution between the piston wall and the cylinder wall, if the features of the invention are provided.

In accordance with yet an added feature of the invention, it is advantageous if a single pin bearing is provided, which additionally is braced to two pairs of housing walls or supports that face opposite each other with at least one additional housing wall or additional support, preferably two housing walls or supports placed opposite each other, which additional housing walls or supports are placed centrally to the lateral housing walls or supports.

In accordance with yet an additional feature of the invention, it is advantageous for manufacture and use of the piston for two-stroke engines, if the piston is formed from a single piece, preferably from steel or a steel alloy, especially if forged or investment-cast.

In accordance with again another feature of the invention, giving consideration to the position of the inlet and outlet openings in the cylinder, it is advantageous if the attachment locations of the supports extending to the pin bearings covered by the skirt wall of at least one outlet opening of the cylinder are situated within the opening area of the outlet opening or if the attachment points of the attachment locations of the shaft wall extending to the pin bearing covered by the skirt wall of at least one outlet opening of the cylinder are situated within the opening area of the outlet opening. Consideration is also to be given with this as to whether the inlet and outlet openings are formed by only one opening or by multiple openings. These multiple openings can be situated next to each other, especially at the same level in the cylinder wall. Then the particular skirt wall covers the at least one outlet opening or the at least one inlet opening. However, at the same time, the attachment locations or the locations at which the supports are connected with the particular skirt wall, are situated within the opening area of the particular opening, so that the pressure exerted by these supports on the particular skirt wall is not exerted in the area of the skirt wall that glides on the inner cylinder wall.

In accordance with again a further feature of the invention, a piston ring is disposed in at least one circumferential groove formed in the skirt walls and the at least one supporting wall. Due to these features, a piston with a piston ring is produced, and what is attained is that the piston ring is well placed against the inner cylindrical wall, and guides the piston and the ends of the skirt walls facing away from the piston head. Also, the sections of the piston ring placed in the support walls between the skirt walls make their contribution, because it is precisely the piston ring in its entirety that is placed under tension on the inner cylinder wall or is supported in the annular groove in the skirt walls and supporting walls. Due to the stable and pre-tensioned configuration of the piston ring, it primarily can glide by the openings formed in the cylindrical wall.

In accordance with again an added feature of the invention, the piston is guided in stable fashion, with improved pressure distribution at the same time, to the inner wall of the cylinder, especially in regard to a proper positioning of the piston ring before the flow mixture openings.

In accordance with again an additional feature of the invention, the piston ring is a prestressed negative oval with a prestressing withdrawn in an area of the mouth opening of the piston ring or lessened relative to a tensioning in a diametrically opposite area of the piston ring, especially by 10 to 30%, and/or the piston ring in the area of the mouth opening and in an area lying opposite the mouth opening is configured to be radially reinforced or expanded, optionally with a reinforcement increasing continuously from an area with a least ring thickness to a maximum value exceeding the least ring thickness measured in radial direction in the area of least ring thickness by 20 to 40%, preferably 25 to 35%, and/or the radially reinforced or expanded area of the piston ring extends over a central angular range of 70 to 110°, especially 80 to 190°. These features make it possible for the piston ring to bridge the outlet opening and the inlet opening, having an opening angle which in relation to the piston circumference is relatively large, without mechanical problems arising on the piston ring. These features also offer advantages with regard to strength.

With the objects of the invention in view, there is also provided a piston ring disposed in at least one circumferential groove formed in the skirt walls and the at least one supporting wall of the piston according to the invention or a piston ring disposed in at least one circumferential groove formed in the skirt walls and the at least one supporting wall of the piston of the cylinder and piston assembly according to the invention. This makes it possible to position the piston ring in the two shaft walls, without imparting mechanical losses to the strength of the skirt walls. These features also permit a good guidance of the section of the piston that is distant from the cylinder head.

In accordance with a concomitant feature of the invention, the piston ring inserted into the at least one circumferential groove, when not subjected to exterior loads, has front surfaces abutting one another or adjoining one another, an outer contour deviating from a circular shape, with a diameter running through the front surfaces or a gap thereof being larger than a diameter running perpendicular thereto, and a difference between the diameters exceeding about 40 to 80%, preferably 50 to 70%, of a smallest ring thickness in an area as measured in radial direction.

These features are appropriate for attaining good adjoining of the piston to the inner cylinder wall surface, with proper deformation of the piston occurring simultaneously so that in its operational setting it has a circular outer circumference that is adapted to the running surface of the cylinder and exactly adjoins this running surface.

Due to this exact adjoining of the piston ring over its entire circumference to the especially circular inner cylinder wall surface, the piston is exactly guided and sealed in the cylinder.

Other features which are considered as characteristic for the invention are set forth in the appended claims.

Although the invention is illustrated and described herein as embodied in a piston, a cylinder and piston assembly and a piston ring for a piston, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 20 and 21 are enlarged, side-elevational views of a combination of a steel piston with a cylinder, according to the invention;

DETAILED DESCRIPTION OF THE INVENTION

Figure 1:
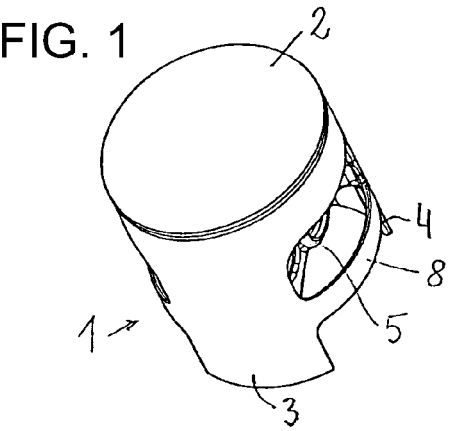
FIG. 1 is a diagrammatic, perspective view of a piston according to the invention.

Referring now to the figures of the drawings in detail and first, particularly, to FIG. 1 thereof, there is seen a piston 1 according to the invention having a piston head 2, onto which skirt walls 3 and 4, placed opposite each other, are shaped. Between these skirt walls 3 and 4 lie two pin bearings 5 and 6. These pin bearings 5, 6 are each braced by a brace 7 on the piston head 2, or configured as one piece therewith.

Two intermediate spaces or recesses 20 between the skirt walls 3 and 4 are each bridged by a supporting wall 8. The supporting wall 8 substantially has the shape of a section of a cylindrical ring, having an outer contour which matches the outer contour of the piston head 2 or a wall piece 9 shaped onto this piston head. This wall piece 9 extends between the skirt walls 3 and 4 and connects them in the area of the piston close to the piston head.

Figure 7:
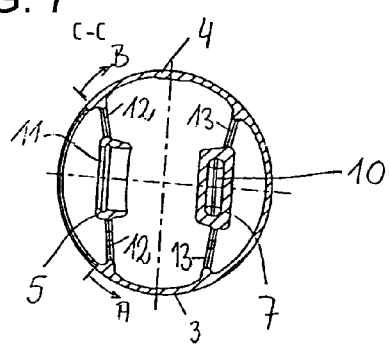
FIG. 7 is a cross-sectional view of the piston.

FIG. 7 shows a snap ring groove 11 configured in the pin bearing to secure a pin.

The pin bearings 5 and 6 are connected or braced by supports 12 and 13 to the skirt walls 3 and 4. Additional support carriers or reinforcement ribs 12' and 13' can be situated or shaped in the area of piston head 2.

Figure 8:
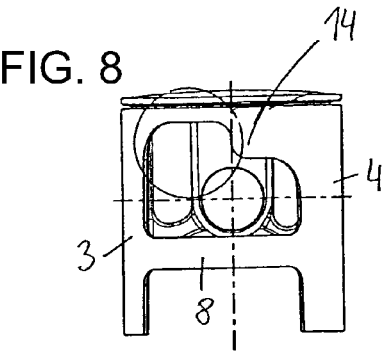
FIG. 8 is a side-elevational view of another embodiment of a piston according to the invention.
Figure 9:
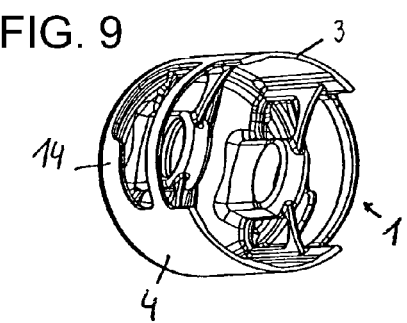
FIG. 9 is a perspective view of the other embodiment.

FIGS. 8 and 9 show an embodiment form of a piston 1, in which a wall piece 14 extends only over a partial area of the recesses 20 between the skirt walls 3 and 4. The wall piece 14 can be situated in one or in both of the recesses 20.

Both the wall piece 14 and a supporting wall 18 are configured so that the pin bearings 5, 6 are freely accessible for installing or removing a pin.

Figure 10:
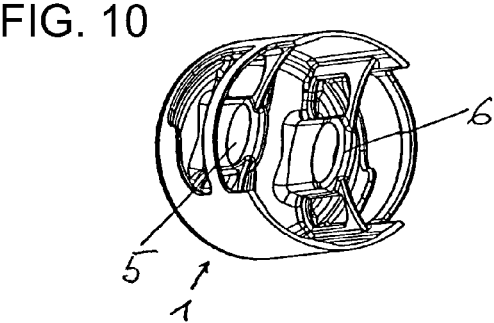
FIG. 10 is a bottom-perspective view of an embodiment form of a piston.
Figure 11:
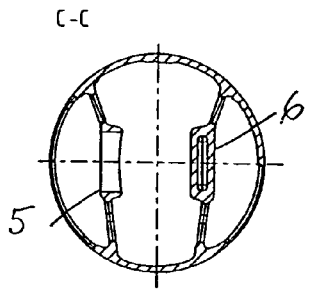
FIG. 11 is a cross-sectional view of the piston.

FIGS. 10 and 11 show views of a piston 1, in which pin bearings 5, 6 are configured without a circlip 11 and a pin can be correspondingly reduced in size.

Figure 12:
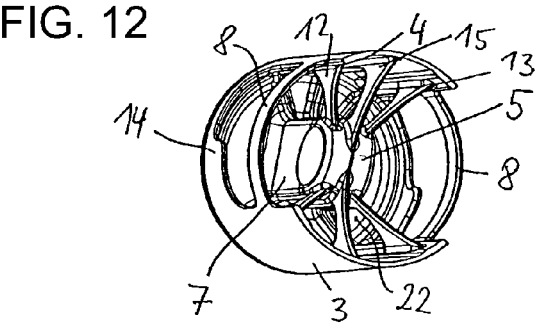
FIGS. 12 to 15 are respective bottom-perspective, cross-sectional, longitudinal-sectional and longitudinal-sectional views of an embodiment form of a piston according to the invention.
Figure 13:
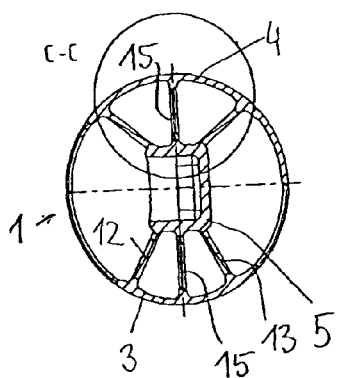
Figure 14:
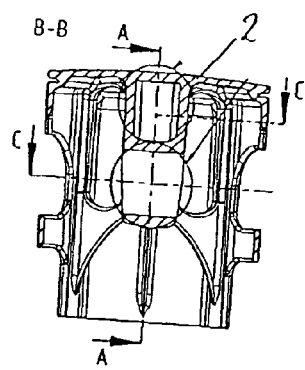

In the embodiment form of a piston 1 depicted in FIGS. 12 to 15, only a single pin bearing 5 is provided, which is shaped or braced on the piston head 2. Especially FIG. 13 shows an additional pair of supports 15 that extend along a diameter of the piston head 2. In principle, it is possible to provide only one support 15, in particular on the side of the pin bearing 5 that is turned toward the skirt wall 4 on an outlet side.

With a single pin bearing, it can be advantageous if the supports 12 and 13 extended to the lateral end areas of the skirt walls 3 and 4 are symmetrically disposed or configured relative to the additional support 15, as is evident from FIG. 13.

Figure 15:
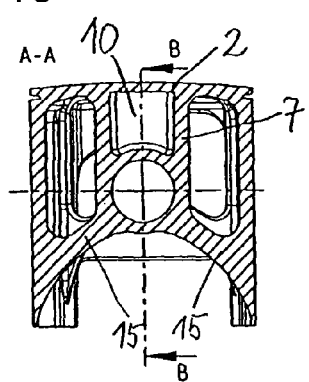

The bracing 7 of this piston 1 is likewise provided with a recess 10, as is evident from FIG. 15.

Figure 6:
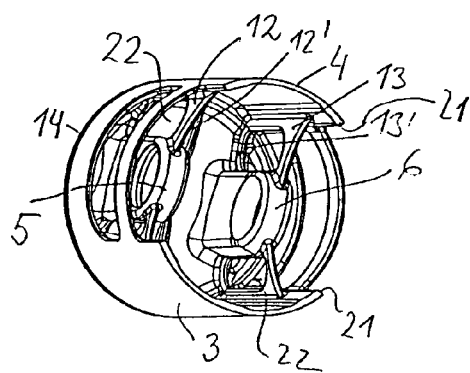
FIG. 6 is a bottom-perspective view of the piston.

It is evident, especially from FIGS. 1 and 6, that the supporting wall 8 follows the contour of the skirt walls 3 and 4. In this way, the skirt walls 3 and 4 are additionally braced on the inner surface of the cylinder, and the pressure of the skirt walls 3 and 4 is evenly distributed onto the inner surface of the cylinder. Additionally, a lubricating film is better distributed and overall there is less danger of comminution.

This process is especially important since the piston according to the invention should be made of steel, for example of a 31 CrMoV9 alloy and be able to endure higher thermal loadings as a piston for a two-stroke engine. However, it is also quite important that the piston shaft should exhibit a certain elasticity. This elasticity is ensured in that on both sides, between the two shaft walls 3, 4, the recess 20 is provided, that is only bridged by the supporting wall 8. In addition, this recess 20 can be at least partially bridged between the two skirt walls 3 and 4 by the wall piece 14, through the use of which the piston 1 is given improved guidance in the cylinder, and vibrations are reduced. Such a piston is especially advantageous for operation with mixtures adjusted to be leaner.

In addition, it is possible to apply surface coatings to the skirt surfaces 3, 4 and the inner wall of the cylinder and/or the supporting wall 18 and/or the wall piece 14, to improve running properties.

As can be seen, for example, from FIG. 7, the supports 12 and 13 extend out from the lateral end areas of the skirt surfaces 3 and 4. The skirt walls 3 and 4 cover at least one overflow opening 26 and at least one inlet opening 27 in a cylinder 28, and are somewhat wider than these openings, as is seen in FIG. 20. Supports 12, 13 each are braced in an area of the skirt walls 3, 4, that lies in front of the inlet or outlet opening.

Due to a configuration of the supports 12 and 13 so that they lie in the area of these openings in the cylinder 28, the elasticity of the skirt walls 3 and 4 in their lateral edge areas is not impaired, and can adjoin those sections of the inner wall surface of the cylinder that lie lateral to the openings in the cylinder in elastic fashion.

It is advantageous if the supporting wall 8 is curved to match the skirt walls 3, 4 and preferably has the shape of a section of a cylindrical ring. The width of the outlet openings and of the overflow openings may be about 65 to 85%, especially 70 to 80%, of the skirt wall 3, 4 covering this particular opening.

It is advantageous if the supporting wall 8 is placed in an area of the skirt walls 3, 4 which corresponds to a height of 50 to 90%, especially 55 to 80%, of the height of the skirt walls 3, 4, measured from the piston head 2, with the width of the supporting wall corresponding to 10 to 25%, especially 10 to 15%, of the height of the skirt walls 3, 4.

Since the skirt walls 3, 4 are of differing height, these data are valid for the higher skirt wall, which closes an outlet opening 25.

Figure 3:
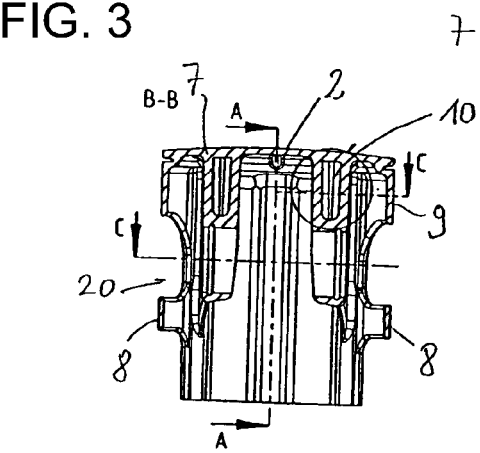
FIG. 3 is a longitudinal-sectional view of the piston.
Figure 4:
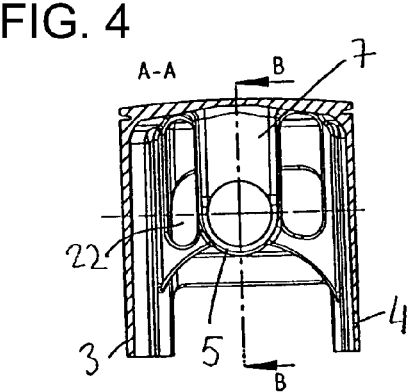
FIG. 4 is a longitudinal-sectional view perpendicular to the section in FIG. 3.

Provision can be made, as seen in FIG. 3, for a cavity or a recess 10 to be formed and specially milled out in the bracing 7 of the pin bolts 5, 6 or the hub on the piston head 2, in order to save weight, which preferably is closed in its end area on the side of the piston head by a non-illustrated insert piece welded into the piston head 2.

Due to the differing outer contour of the skirt walls 3 and 4, the supports 12 and 13 are at differing angles to the piston axis. The position of the supports 12, 13 with a piston according to FIG. 7 results from the position of the pin bearings 5 and 6 and the position of the lateral end areas of the skirt walls 3 and 4, which end areas lie or adjoin outside bracing points of the supports 12, 13.

The supports 12 and 13 are thus connected at a pre-set interval from the lateral end areas or lateral surfaces 21 of the skirt walls 3 and 4. In an advantageous fashion, the mutual interval between the supports 12 and 13 with the particular skirt walls 3 and 4 is about 65 to 85%, especially 70 to 80%, of the width of the particular skirt wall 3 or 4. On the side, the width of the skirt walls 3, 4 exceeds the width of the outlet opening, including additional outlet openings. This avoids rigid areas of the skirt walls 3 and 4 coming to lie directly on the outlet-side narrow cylindrical wall area between the outlet channel and an additional outlet channel, since there high temperatures and a high specific compression prevail, which can lead to comminution. By moving the supports 12, 13 into an area in which they come to lie in front of, or within, the outlet channel opening or outlet opening, the piston or the skirt walls 3 and 4 become more elastic and specific compression is reduced.

It is advantageous if the wall part 14 has the form of a section of a cylindrical ring or is adapted to the form of the outer contour of the piston head 2 with the height of the wall part 14 being 5 to 25%, preferably 10 to 20%, of the height of the skirt walls 3, 4 if necessary, or the wall part 14 extending over 30 to 70%, preferably 40 to 60%, of the interval between the lateral surfaces 21 of the skirt walls 3, 4.

In order to increase the mechanical load capacity of the piston 1, provision is made for transitional sections from the supporting walls 8 and the wall part 14 to the piston head 2 or to the skirt walls 3 and 4 to be rounded.

As is especially evident from FIGS. 6 and 12, the supports 12, 13 and 15 project from a section of the pin bearing 5 that is distant from the piston head.

It has been shown to be advantageous if the strip-shaped supporting surface 8 runs parallel to the piston head 2.

The piston according to the invention is easy to manufacture and in any case can be shaped or forged or investment-cast from one piece up to an insert piece for closing the recess 10.

It is advantageous to produce flow-through openings formed between the supports 12, 13, 15 and the brace 7 or interior surfaces of the skirt walls 3 and 4, since in this way, mixture transport is not impaired within the piston, and cooling is improved.

Based on the material used for the piston, namely steel, it is possible to dispense with snap rings or creation of snap ring grooves 11, since through size reduction, the pin can be inserted into a borehole of the pin bearing 5, 6.

Due to a central attachment of the brace 7 on the piston head 2, with a single pin bearing, it is possible to apply the force of combustion pressure centrally on the pin. It this case, a forked connecting rod is to be provided. Due to the high pressure acting on a single pin bearing, it is advantageous to attach an additional support 15, that is attached or connected centrally on the pin bearing 5 and centrally on the particular skirt wall 3 or 4, and thus force is applied directly on the hub or on the pin with no reversal. In this way, it is possible for one support 15 to be provided only on the compression side of the piston, depending on the loading.

In practice, it is shown that due to the supporting wall 8, considerable weight is reduced due to the free surfaces or recesses 20 between the skirt walls 3 and 4, but without impairing guiding qualities. It also has been shown that the wall surface 8 does not absolutely have to be configured in the end area of the skirt walls 3 and 4 that are distant from the piston head. The wall surface 8 can also be configured at a distance from the end areas of the skirt walls 3 and 4 distant from the piston.

In addition, provision is made for the skirt surfaces 3 and 4 and the supporting walls 8 to have a circular cross section at the height of the supporting wall or guiding bond 8. Above the supporting wall 8 or in the end areas thereof close to the piston, the skirt walls 3 and 4 do in fact have an oval cross section that, like the circumference of the piston head, deviate slightly from a circular shape.

Figure 16:
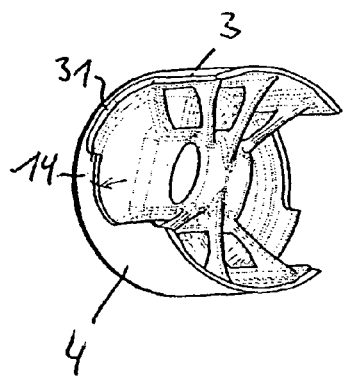
FIG. 16 is a bottom-perspective view of a further embodiment of the piston according to the invention.

FIG. 16 shows a perspective view of a piston in which provision is made for an annular wall 31 to adjoin the wall piece 14, that follows the outer contour of the piston head 2 and goes into the particular skirt wall 3, with the height of this annular wall 31 amounting to about 20 to 40% of the height of the wall piece 14.

Figure 17:
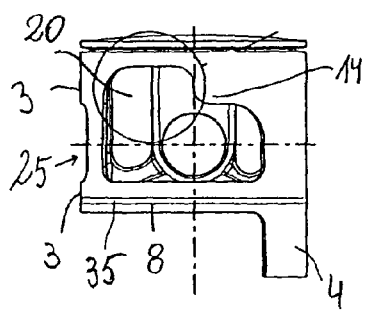
FIGS. 17, 18 and 19 are respective side-elevational, perspective and side-elevational views of a piston in which a skirt wall covering an outlet opening is shaped to be longer than an opposite skirt wall.

FIG. 17 shows a side view of a piston according to the invention in which the skirt wall 3 is configured to be shorter than the skirt wall 4. The skirt wall 3 ends at the level of the supporting wall 8. In principle, the skirt wall 3 could also project beyond the supporting wall 8. However, in this embodiment form of the invention, provision is made for the skirt wall 3 to be kept shorter and a cutout 34 to be formed in the skirt wall 3, for reasons of weight savings. Such a piston can be used with particular advantage if the cylinder 28 in which the piston 1 is to run, has no inflow openings.

Figure 18:
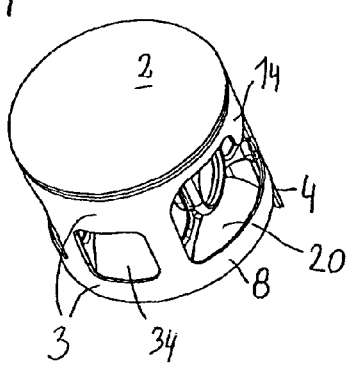

It can be gleaned from FIG. 18 that the skirt wall 3 derives from two lateral ribs running in the direction of the piston axis, that is a rib close to the piston head and a rib far from the piston head. This embodiment suffices to ensure good gliding of skirt wall 3 on the inner surface of cylinder 28.

Figure 19:
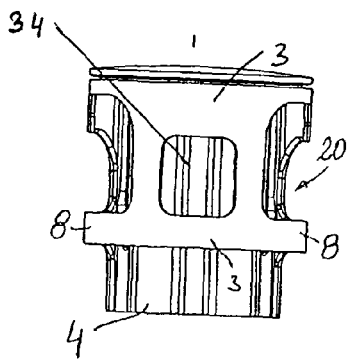

FIG. 19 shows a view of this embodiment form of a piston 1 illustrating the skirt surface 3.

FIGS. 20 and 21 show an embodiment form of a piston 1 according to the invention in a cylinder 28. The skirt wall 4 covers an outlet opening 25 of the cylinder 28. One can perceive a row of overflow openings 26, which are configured substantially at the same height in a wall of the cylinder 28. An inlet opening 27 can be covered by the skirt wall 3.

In addition, one can perceive starting points 29 and 30 of supports 12 and 13 on the inner surface of the particular skirt wall 3 or 4, with the supports 12, 13 acting as bracings for the pin bearing 5, that is shaped onto the piston head 2.

It can be seen from FIG. 21 that the height of the wall piece 14 at most matches the height difference between the upper edge of the outlet opening 25 and the upper edge of the at least one overflow opening 26.

It can be advantageous if the cutout 34 has a height that is 20 to 80%, especially [a range of percentages missing here] of the height of the skirt wall 3, and a width that is 30 to 70%, especially 40 to 65%, of the width of the skirt wall 3.

Figure 5:
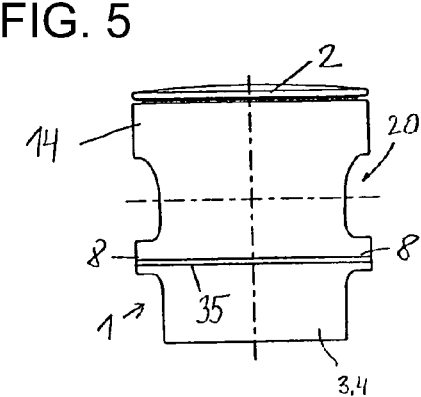
FIG. 5 is a side-elevational view of the piston turned 90° from the view of the piston in FIG. 2.
Figure 22:
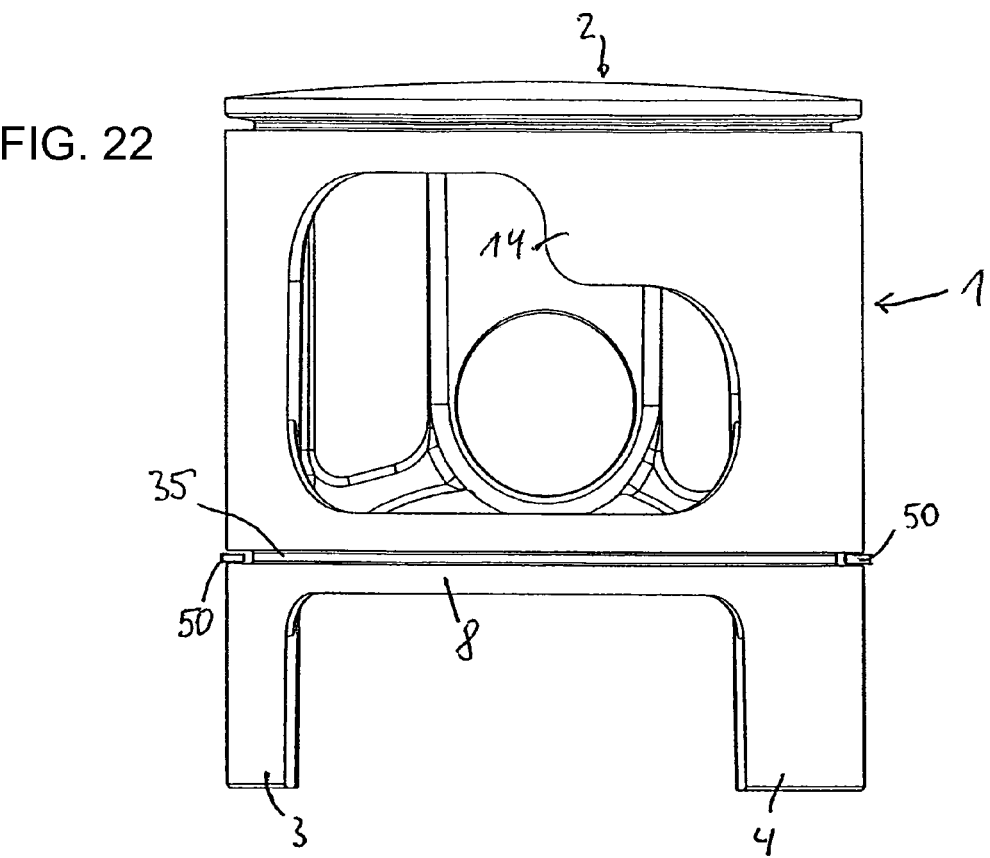
FIGS. 22 and 23 are respective side-elevational and perspective views of a steel piston with a piston ring in a support bond.
Figure 23:
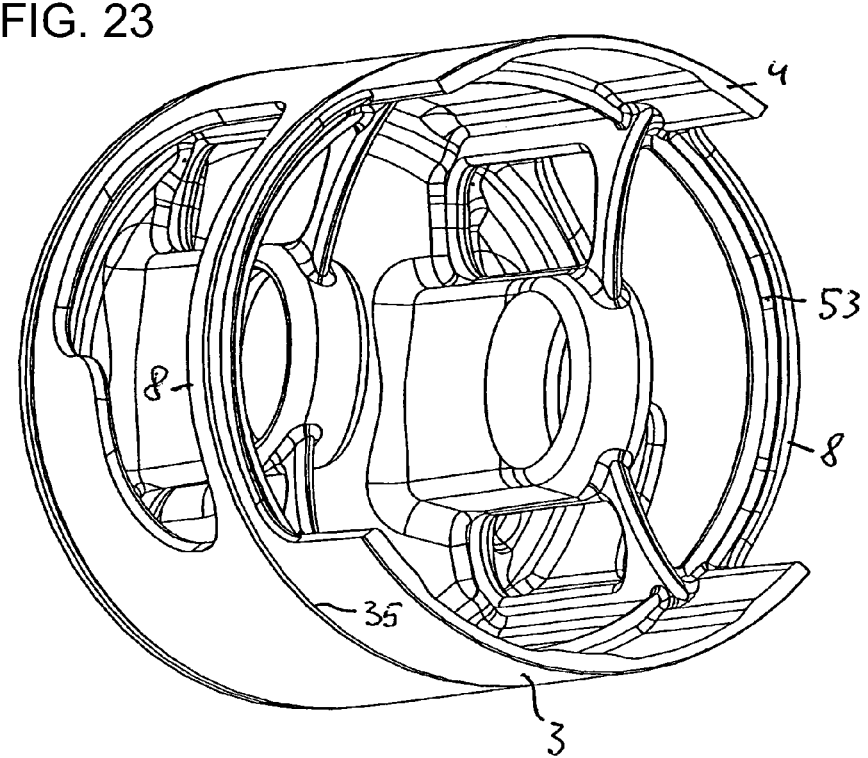
Figure 24B:
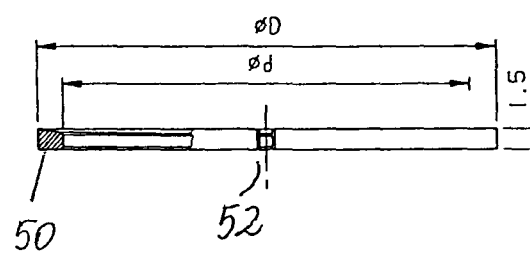
FIGS. 24a and 24b are respective top-plan and side-elevational views of a piston ring.
Figure 24A:
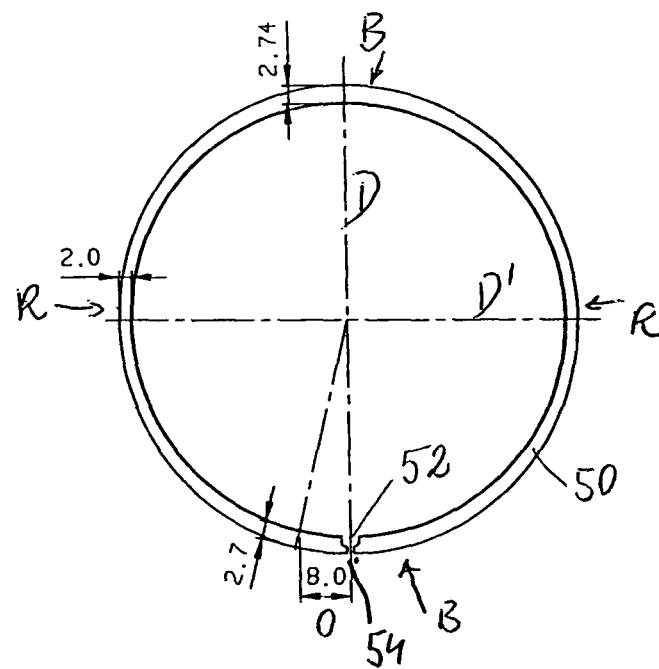

As is evident in FIGS. 5 and 7, grooves 35 for receiving piston rings 50 that also run over the outer contour, can be incorporated into the pistons. These piston rings 50 are inserted in these grooves 35 and secured against distortion. In this way, the sealing behavior of the bond or supporting wall 8 can be improved, and the power efficiency of the crankcase pump is increased and carbureted fuel losses are reduced. Additionally, carbureted gases are prevented from escaping between the piston and the cylinder wall directly into the exhaust. Such pistons are also depicted in FIGS. 22 and 23. FIGS. 24a and 24b show piston rings 50 that can be inserted into the grooves 35.

As is evident in FIGS. 5, 7, 22 and 23, in piston 1, the grooves 35 running over the outer contour of the skirt walls 3, 4 and the supporting walls 8 are incorporated to receive the piston rings 50. The piston rings 50 are inserted into these annular grooves 35 and secured against distortion. In this way, the sealing behavior of the piston can be improved, and the power efficiency of the crankcase pump is increased and carbureted fuel losses are reduced. Additionally, carbureted gases are prevented from escaping between the piston and the inner wall surface of the cylinder directly into the exhaust.

Figure 2:
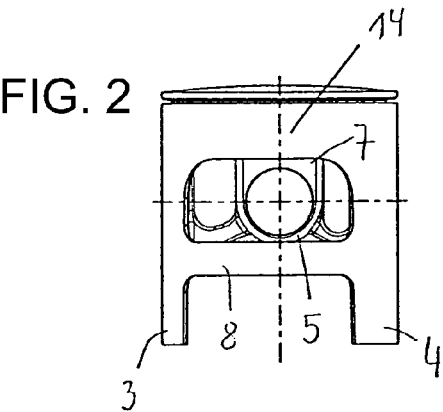
FIG. 2 is a side-elevational view of the piston according to FIG. 1.

FIG. 7 shows a view of a piston 1 as per FIGS. 1 and 2 with a piston ring 50 inserted into the annular groove 35. The annular groove 35 can be configured in various positions.

FIG. 24a shows a piston ring 50 that has a piston mouth 52. This piston ring 50 is shown in its closed setting, i.e. in its pressed-together setting or condition. When not subjected to exterior loading, the piston ring 50 has a mouth width O, as is indicated in FIG. 24a. Provision is made for the piston ring 50 to be prestressed into a negative oval, with prestressing withdrawn in an area B of the ring mouth 52 or reduced relative to the prestressing in an area of the ring diametrically opposite thereto.

This prestressing serves to ensure that as soon as the piston 1 with the piston ring 50 is placed in a cylinder 28, the piston ring 50 can adjoin or be pressed properly on the inner wall surface of the cylinder.

What is principally provided to achieve this prestressing is that the piston ring 50, in the area of its mouth opening 52, and in the area B opposite the mouth opening 52, is configured to be radially reinforced or radially expanded. The reinforcement can increase continuously from an area R having the least ring thickness to a maximum value that exceeds the smallest ring thickness measured in the radial direction by 20 to 40%, preferably 25 to 35%.

In order to optimally carry out the functions of the piston ring 50 according to the invention, namely guiding the piston 1 and sealing the piston 1 vis-à-vis the inner wall surface of the cylinder, it is advantageous if the piston ring 50 is supported in its annular groove 35, distanced at an interval range of from 50 to 98%, preferably 60 to 98%, of the height of the piston from the piston head 2.

In order to avoid a weakening of the skirt walls 3, 4 by incorporating an annular groove 35, a circumferential wall reinforcement 53 is formed on the particular inner sides of the skirt walls 3, 4 in the area of the annular groove 35, as seen in FIG. 23. The height and width of the wall reinforcements 53 can exceed the height of the annular groove 35 or the depth of the annular groove 35 by about 50 to 200%, preferably 80 to 150%.

In order to provide high elasticity and strength for the piston ring 50, provision is made for the particular radially expanded area of the piston ring 50 to extend over a central angular range from 70 to 110°, especially 80 to 190°, and/or for the cross section of the piston ring 50 to be trapezoidal-shaped, with the longer of the parallel sides forming the outer contour of the piston ring 50.

As is evident from FIG. 24a, provision is made, with front surfaces 54 that abut each other, for the piston ring 50 to have an outer contour deviating from a circular shape, with a diameter D through the gap being greater than a diameter D' running perpendicular thereto, and a difference between these two diameters exceeding about 40 to 80%, preferably 50 to 70%, of the least ring thickness, measured in the radial direction.

Through the use of the piston ring 50, the skirt surfaces 3 and 4 are additionally braced on the interior wall surface of the cylinder 28, and the pressure of the skirt walls 3 and 4 is more evenly distributed onto the inner wall surface of the cylinder 28. Additionally, the lubricating film is better distributed and overall there is less danger of comminution.

This process is especially important since the piston according to the invention should be made of steel, for example of a 31 CrMoV9 alloy, and be able to endure higher thermal loadings as a piston for a two-stroke engine. The support pieces or supporting walls 8 that act as a bridge over a free space 51 between the two skirt walls 3 and 4 aid the guidance of the piston 1 in the cylinder 28 and reduce vibrations.

In practice, it is shown that due to the free spaces 51 which are provided, weight is considerably reduced, without impairing the guidance properties. It also has been shown that the annular groove 35 running in a plane perpendicular to the piston axis does not absolutely have to be configured in the end area of the skirt walls 3 and 4 that are distant from the piston head. The annular groove 35 can also be configured at a distance from the end areas of the skirt walls 3 and 4 distant from the piston.

Provision is additionally made for the outer surfaces of the skirt walls 3 and 4 to have a circular cross section, at the height of the annular groove 35. Above the annular groove 35, i.e., in the end areas thereof close to the piston head, the outer surfaces of the skirt walls 3 and 4 can, in fact, have an oval cross section that, like the circumference of the piston head, deviates slightly from a circular shape.

It is possible for one skirt wall 3 to be configured to be shorter than the other skirt wall 4. The one skirt wall 3 could end just beneath the level of the annular groove 35. With such an embodiment form of the invention this one skirt wall 3 is kept shorter and if need be, in addition a cutout 34 is formed in this skirt wall 3, for reasons of weight savings.

Such a piston can be used with particular advantage if the cylinder 28, in which the piston 1 is to run, has no inflow openings.

It is important that the supporting walls 8, which connect the skirt walls 3, 4, be self-supporting and not connected with other piston components such as the pin bearings 5 or the housing walls, so that in particular their elastic properties are not impaired. This is also especially significant with the placement of a piston ring in a groove 35 running in the supporting walls 8, to permit uniform, unhindered changes in shape due to heating. In addition, this version is light and easy to manufacture.

The invention claimed is:

1. A piston, comprising:
    a piston head;
    two skirt walls lying opposite one another and each extending over a partial area of an outer contour of the piston or said piston head;
    at least one pin bearing braced on said piston head and disposed between said skirt walls;
    at least one supporting wall interconnecting said skirt walls and disposed at a distance from said piston head, said at least one supporting wall bordering an intermediate space separating said piston head from said at least one supporting wall in a self-supporting fashion between said skirt walls, and said at least one supporting wall not being connected with said at least one pin bearing; and
    a piston ring disposed below said at least one pin bearing in at least one circumferential groove formed in said skirt walls and formed in said at least one supporting wall separated from said piston head by said intermediate space.

2. The piston according to claim 1, wherein said at least one self-supporting wall is strip-shaped.

3. The piston according to claim 1, wherein said supporting wall has a curvature matching a curvature of said skirt walls.

4. The piston according to claim 3, wherein said supporting wall has a shape of a section of a cylindrical ring.

5. The piston according to claim 1, wherein one of said skirt walls extends over an angle of 55 to 90° and/or the other of said skirt walls extends over an angle of 90 to 115° along an outer contour or edge of said piston head or is shaped onto said piston head.

6. The piston according to claim 1, wherein one of said skirt walls extends over an angle of 60 to 80° and/or the other of said skirt walls extends over an angle of 100 to 110° along an outer contour or edge of said piston head or is shaped onto said piston head.

7. The piston according to claim 5, wherein said skirt walls have equal heights.

8. The piston according to claim 6, wherein said skirt walls have equal heights.

9. The piston according to claim 1, wherein side surfaces of said skirt walls, said at least one supporting wall connecting said skirt walls and a lower edge of said piston head, define a cutout leaving said at least one pin bearing free.

10. The piston according to claim 1, wherein said at least one supporting wall is disposed in an area of said skirt walls at a height of 50 to 90% of a height of said skirt walls or of a height of a taller one of said skirt walls measured from said piston head, and/or said at least one supporting wall has a height of 10 to 25% of said height of said skirt walls or of said height of said taller skirt wall.

11. The piston according to claim 1, wherein said at least one supporting wall is disposed in an area of said skirt walls at a height of 55 to 80% of a height of said skirt walls or of a height of a taller one of said skirt walls measured from said piston head, and/or said at least one supporting wall has a height of 10 to 15% of said height of said skirt walls or of said height of said taller skirt wall.

12. The piston according to claim 1, wherein said at least one supporting wall is placed at an interval from said at least one pin bearing and/or said at least one supporting wall is connected exclusively with said skirt walls and carried by them exclusively.

13. The piston according to claim 1, which further comprises rounded transitional sections from the supporting walls and/or wall part to at least one of said piston head or said skirt walls.

14. The piston according to claim 1, wherein said at least one supporting wall and said skirt walls have a circular outer contour at a level of said at least one supporting wall or at an end area of said skirt walls.

15. The piston according to claim 1, wherein said piston ring has a mouth opening fixed in an outer contour area of one of said skirt walls.

16. The piston according to claim 15, wherein said piston ring is a prestressed negative oval with a prestressing withdrawn in an area of said mouth opening of said piston ring or lessened relative to a tensioning in a diametrically opposite area of said piston ring and/or said piston ring in said area of said mouth opening and in an area lying opposite said mouth opening is configured to be radially reinforced or expanded, optionally with a reinforcement increasing continuously from an area with a least ring thickness to a maximum value exceeding said least ring thickness measured in radial direction in said area of least ring thickness by 20 to 40% and/or said radially reinforced or expanded area of said piston ring extends over a central angular range of 70 to 110°.

17. The piston according to claim 16, wherein said prestressing is withdrawn or lessened by 10 to 30%, said reinforcement increases by 25 to 35% and said radially reinforced or expanded area extends over a central angular range of 80 to 190°.

18. The piston according to claim 1, wherein said piston ring is supported at an interval of from 50 to 88% of a height of the piston from said piston head in said at least one circumferential groove.

19. The piston according to claim 1, wherein said piston ring is supported at an interval of from 60 to 88% of a height of the piston from said piston head in said at least one circumferential groove.

20. The piston according to claim 1, which further comprises a circumferential wall reinforcement disposed on an inner side of said skirt walls and said at least one supporting wall in vicinity of said at least one circumferential groove.

21. The piston according to claim 20, wherein said wall reinforcements have a height and a width exceeding a height of said at least one circumferential groove or a depth of said annular groove by about 50 to 200%.

22. The piston according to claim 20, wherein said wall reinforcements have a height and a width exceeding a height of said at least one circumferential groove or a depth of said annular groove by about 80 to 150%.

23. A cylinder and piston assembly, comprising:
a cylinder; and
a piston according to claim 1 belonging to or supported within said cylinder.

* * * * *